US011935382B2

(12) United States Patent
Kothari et al.

(10) Patent No.: US 11,935,382 B2
(45) **Date of Patent: *Mar. 19, 2024**

(54) METHODS, APPARATUSES, AND SYSTEMS FOR CONFIGURING A FLAME DETECTION APPARATUS USING FLAME DETECTING COMPONENTS

(71) Applicant: Honeywell International Inc., Charlotte, NC (US)

(72) Inventors: Sanjay Kothari, Bengaluru (IN); Sheetal Hanagandi, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,524

(22) Filed: Jul. 1, 2022

(65) Prior Publication Data

US 2022/0335801 A1 Oct. 20, 2022

Related U.S. Application Data

(63) Continuation of application No. 17/247,766, filed on Dec. 22, 2020, now Pat. No. 11,403,930.

(51) Int. Cl.
*G08B 17/12* (2006.01)

(52) U.S. Cl.
CPC .................................... *G08B 17/12* (2013.01)

(58) Field of Classification Search
CPC ...... G08B 29/145; G08B 17/00; G08B 29/14; G01J 5/0014; G01N 21/35
See application file for complete search history.

(56) References Cited

U.S. PATENT DOCUMENTS

| | | | | |
|---|---|---|---|---|
| 9,391,714 B2 | 7/2016 | Meah et al. | | |
| 9,847,019 B2 | 12/2017 | Meah et al. | | |
| 10,181,244 B1 | 1/2019 | Grady et al. | | |
| 2010/0182153 A1 | 7/2010 | Jensen | | |
| 2013/0300579 A1* | 11/2013 | Meah | ..................... | G08C 23/04 340/870.28 |
| 2018/0200552 A1* | 7/2018 | Wertsberger | ........... | A62C 37/40 |

(Continued)

FOREIGN PATENT DOCUMENTS

KR 10-0990334 B1 10/2010

OTHER PUBLICATIONS

U.S. Appl. No. 17/247,766, filed Dec. 22, 2020, U.S. Pat. No. 11,403,930, Issued.

(Continued)

*Primary Examiner* — Mirza F Alam
(74) *Attorney, Agent, or Firm* — Alston & Bird LLP

(57) ABSTRACT

Methods, apparatuses and systems for configuring a flame detection apparatus using flame detecting components are disclosed herein. An example apparatus may comprise: a controller component and at least one flame detecting component in electronic communication with the controller component. The flame detecting component may be configured to detect infrared radiation associated with a fire in an environment and receive and transmit communication signals. In response to detecting a first infrared control (IR) signal, the flame detecting component may provide an indication of the first IR control signal to the controller component.

16 Claims, 3 Drawing Sheets

(56) References Cited

U.S. PATENT DOCUMENTS

| | | | | |
|---|---|---|---|---|
| 2020/0271524 | A1* | 8/2020 | Jansson | G08B 17/00 |
| 2020/0272524 | A1* | 8/2020 | Citerin | H04N 5/232411 |
| 2020/0348446 | A1* | 11/2020 | Tremsin | G06T 5/50 |
| 2021/0208001 | A1* | 7/2021 | Kim | G06T 7/62 |

OTHER PUBLICATIONS

European search report dated May 11, 2022 for EP Application No. 21215157.

Non-Final Office Action received for U.S. Appl. No. 17/247,766, dated Oct. 21, 2021, 20 pages.

Notice of Allowance received for U.S. Appl. No. 17/247,766, dated Mar. 30, 2022, 9 pages.

EP Office Action dated May 3, 2023 for EP Application No. 21215157, 6 page(s).

EP Office Action dated Jan. 26, 2024 for EP Application No. 21215157, 6 page(s).

* cited by examiner

METHODS, APPARATUSES, AND SYSTEMS FOR CONFIGURING A FLAME DETECTION APPARATUS USING FLAME DETECTING COMPONENTS

CROSS-REFERENCE TO RELATED APPLICATIONS

This application is a continuation application of and claims priority to U.S. patent application Ser. No. 17/247,766, filed Dec. 22, 2020, entitled "METHODS, APPARATUSES, AND SYSTEMS FOR CONFIGURING A FLAME DETECTION APPARATUS USING FLAME DETECTING COMPONENTS", the entire contents of each of which are hereby incorporated by reference herein in their entirety for all purposes.

BACKGROUND

Flame detection apparatuses may be present in environments where there is a possibility of fire. The flame detection apparatuses may comprise flame detecting components (e.g., optical sensors) configured to monitor a field of view and generate alerts or alarms based on detected environmental conditions. Many flame detection apparatuses are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for configuring an apparatus, for example a flame detection apparatus.

In accordance with various examples of the present disclosure, an apparatus is provided. The apparatus may comprise a controller component; and at least one flame detecting component in electronic communication with the controller component, the at least one flame detecting component configured to: detect infrared radiation associated with a fire in an environment, receive and transmit communication signals, and in response to detecting a first infrared control (IR) signal, provide an indication of the first IR control signal to the controller component.

In some examples, the controller component is configured to analyze the first IR control signal and cause modification of at least one configuration setting of the flame detecting component based at least in part on analysis of the first IR control signal.

In some examples, causing modification of the at least one configuration setting comprises causing modification of at least one of a sensitivity setting or adjusting a field of view associated with the flame detecting component.

In some examples, the at least one flame detecting component comprises at least one IR sensor.

In some examples, the first IR control signal is generated by an IR configurator apparatus comprising at least an IR transceiver and at least one IR source element.

In some examples, the flame detection apparatus further comprises at least one IR source element.

In some examples, the controller component is further configured to cause generation of a second IR control signal.

In some examples, each of the flame detection apparatus and the IR configurator apparatus comprise encryption keys for encoding and decoding information contained in IR control signals.

In some examples, each of the flame detection apparatus and the IR configurator apparatus are configured to generate IR control signals based at least in part on a proprietary communication protocol.

In some examples, the flame detection apparatus further comprises at least one indication element. Subsequent to causing generation of the second IR control signal, the controller component may be configured to cause activation of the at least one indication element.

In accordance with various examples of the present disclosure, a method for forming a wireless communication channel is provided. The method may comprise receiving, by a controller component of a flame detection apparatus, an indication of a first IR control signal, wherein the first IR control signal is detected by at least one flame detecting component of the flame detection apparatus in electronic communication with the controller component, and wherein the at least one flame detecting component is configured to detect infrared radiation associated with a fire in an environment and receive and transmit communication signals.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
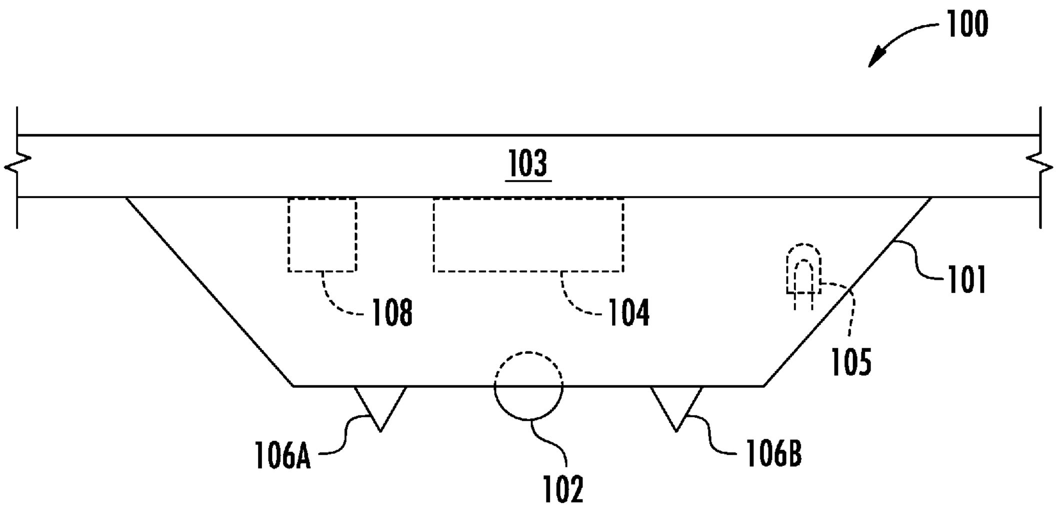
FIG. 1 illustrates an example flame detection apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, an example processing circuitry, communication module, input/output module, memory, flame detecting component) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "electromagnetic radiation" or "radiation" may refer to various kinds of electromagnetic radiant energy that exhibits properties of waves and particles including visible light, radio waves, microwaves, infrared (IR), ultraviolet (UV), X-rays and gamma rays. Visible light may refer to electromagnetic radiation that can be detected by a human eye. The electromagnetic spectrum comprises a range of all known types of electromagnetic radiation, including electromagnetic radiation that cannot be detected by the human eye. Various portions of the electromagnetic spectrum are associated with electromagnetic radiation that has certain characteristics (e.g., certain wavelengths and frequencies). For example, visible light emits electromagnetic radiation with wavelengths ranging between 380 and 750 nanometers (nm). In contrast, IR electromagnetic radiation may comprise wavelengths ranging between 0.7 and 5 microns.

A fire source produces electromagnetic radiation with certain characteristics. For example, flames associated with a fire source may emit electromagnetic radiation with particular IR, visible light and UV characteristics/properties (e.g., wavelengths, frequencies, and/or the like). These characteristics and properties may depend on characteristics of the fire source (e.g., fuel type). By way of example, flames generated by a hydrocarbon fuel source may emit IR radiation with a frequency between 2.7 microns and 4.5 microns and a UV signal with a frequency of 0.2 microns. While the visible light radiation produced by a fire can be perceived visually (e.g., as red and yellow flames), the IR and UV radiation cannot be detected by the human eye.

Flame detection apparatuses may be configured to monitor a field of view and generate alerts or alarms and/or activate a fire suppression system based on detected environmental conditions. An example flame detection apparatus may be configured to detect radiation (e.g., visible light, UV and/or IR), smoke, temperature, combinations thereof, and/or the like within an environment. In some embodiments, flame detection apparatuses may be required and/or installed in environments where there is a high likelihood of a fire and/or where certain types of combustible materials are utilized or stored. For example, flame detection apparatuses may be required at power plants, chemical storage and production facilities, hydrocarbon facilities or the like.

In general, a flame detection apparatus may comprise at least one flame detecting component for detecting radiation (e.g., flames) within a field of view of the flame detection apparatus. An example field of view may be or define a coverage area, range and/or angle of view in a vicinity of the flame detection apparatus. In various embodiments, the field of view of a flame detection apparatus may be manually and/or programmatically adjustable. For example, the field of view may be manually adjustable by directing (e.g., pointing) the flame detecting component in a direction of a likely source of fire within an environment. Additionally and/or alternatively, the field of view may be a programmatically selected distance or range (e.g., 15 meters, 30 meters, 45 meters or 60 meters). The example flame detection apparatus may be configured to identify radiation characteristics (e.g., a modulation rate or flicker rate) associated with a fire source. The flame detection apparatus may store information (e.g., algorithms) such that it can process received information in order to identify radiation associated with fire sources. An example flame detecting component may be or comprise an optical component, for example, without limitation, an IR sensor, UV sensor, and/or the like. In some embodiments, the flame detection apparatus may comprise combinations of flame detecting components. An example flame detection apparatus may comprise a UV sensor and an IR sensor. Another example flame detection apparatus may comprise a plurality of IR sensors (e.g., multispectrum IR sensors). In response to detecting radiation with particular characteristics (i.e., indicating the presence of flames) within the field of view, a flame detection apparatus may trigger activating an alarm/alert and/or a fire suppression system.

In various embodiments, a flame detection apparatus may periodically require service, testing and/or recalibration after being installed in the field. For example, the flame detection apparatus may require periodic (e.g., semi-annual, annual) testing in order to satisfy safety regulations. Additionally, the performance of a flame detection apparatus may be affected by dirt and debris incident on flame detecting components. In some cases, one or more components of a flame detection apparatus may malfunction such that the flame detection apparatus will not be able to detect radiation and may in some cases fail to trigger an alert. In order to ensure proper functioning in high-risk environments, it is therefore necessary that a flame detection apparatus can routinely provide operational status information and also be periodically tested and/or updated. By way of example, a flame detecting component may require replacement/cleaning, a power source (e.g., battery) may need to be replaced or the like. Although some existing flame detection apparatuses may be configured to communicate status information via indication elements (e.g., light emitting diodes (LEDs)), detected faults and issues may not be readily apparent particularly in an instance in which the flame detection apparatus is located out of reach such that a wired connection cannot easily be established. Accordingly, it may be necessary to completely remove the flame detection apparatus in order to properly diagnose and remediate any exiting faults. In another example, if there is more that one fault present, indication elements may indicate a fault condition without actually specifying the types or faults.

In some embodiments, it may be necessary to modify flame detection apparatus configuration settings in response to environmental changes and/or changes in safety requirements associated with an environment. For instance, a flame detection apparatus may require reconfiguration in response to environmental modifications. By way of example, in a hydrocarbon storage environment, relocation of a storage tank may necessitate physical relocation and/or programmatic reconfiguration of a flame detection apparatus in an area corresponding with the location of the storage tank. In another example, a flame detection apparatus may need to be reconfigured in an instance in which changes to an associated fire detection system have been made (e.g., removal or addition of new apparatuses). Additionally and/or alternatively, operational parameters (e.g., sensitivity) of a flame detecting component may need to be adjusted based at least in part on characteristics of the potential fire sources (e.g., fuel types) in an environment. Accordingly, if a fuel type present within an environment is removed or replaced, the operational parameters of one or more flame detecting components may also need to be modified.

In general, flame detection apparatuses may be configured in the field using wired communication protocols such as Modbus, HART, RS485 and/or the like which require a cable to provide a communication channel between the flame detection apparatus and a specialized control device. Additionally, end users are often unable to operate such control devices and may require a skilled technician in order to make even minor changes to configuration settings. As noted above, existing flame detection apparatuses are not configured to wirelessly receive and transmit data/information and typically have no wireless functionalities such as Wi-Fi, Bluetooth, ZigBee or the like. Wireless functionalities are generally foregone due to technical challenges such as design limitations and difficulty meeting various safety and certification standards when such wireless functionalities are introduced. In some cases, for security reasons, regulations do no permit wireless functionality for flame detection apparatuses due to safety concerns. Additionally, incorporating wireless functionalities in flame detection apparatuses increases overall production costs and production complexity.

In accordance with various embodiments of the present disclosure, example methods, apparatuses and systems are provided.

In various embodiments, the present disclosure may provide an apparatus comprising a controller component and at least one flame detecting component. The at least one flame detecting component may be configured to detect infrared radiation associated with a fire in an environment and receive and transmit communication signals. In response to detecting a first infrared control (IR) signal, the flame detecting component may provide an indication of the first IR control signal to the controller component. In some examples, the controller component may be configured to analyze the first IR control signal and cause modification of at least one configuration setting of the flame detecting component based at least in part on analysis of the first IR control signal. Causing modification of the at least one configuration setting comprises causing modification of at least one of a sensitivity setting or adjusting a field of view associated with the flame detecting component. The flame detecting component may comprise at least one IR sensor. The first IR control signal may be generated by an IR configurator apparatus comprising at least an IR transceiver and at least one IR source element. The flame detection apparatus may comprise at least one IR source element. The controller component may further be configured to cause generation of a second IR control signal. Each of the flame detection apparatus and the IR configurator apparatus may comprise encryption keys for encoding and decoding information contained in IR control signals. Each of the flame detection apparatus and the IR configurator apparatus may be configured to generate IR control signals based at least in part on a proprietary communication protocol. The flame detection apparatus may further comprise at least one indication element. Subsequent to causing generation of the second IR control signal, the controller component may be configured to cause activation of the at least one indication element.

Referring now to FIG. 1, an example schematic diagram depicts an example flame detection apparatus 100 in accordance with various embodiments of the present disclosure. In particular, the example flame detection apparatus 100 comprises a housing 101, at least one flame detecting component 102, indication elements 106A and 106B, a controller component 104, at least one IR source element 105 and a power source 108. The fire detection apparatus 100 may be in wired communication with a plurality of apparatuses including a fire alarm control panel. The fire detection apparatus 100 may be a component of a network of apparatuses (e.g., other fire detection apparatus(es), heat detection apparatuses, and the like) defining a fire detection and/or suppression system.

As depicted in FIG. 1, the flame detection apparatus 100 comprises a housing 101. As shown, the housing 101 is removably mounted on a ceiling 103 within an environment. Although the housing 101 of the flame detection apparatus 100 is shown mounted on a ceiling 103, the flame detection apparatus 100 may be mounted on a different surface, such as a wall or alternative structure or body within the environment. An example housing 101 may comprise metal (e.g., stainless steel, aluminum), plastic, combinations thereof, and/or the like.

While some of the embodiments herein provide an example flame detection apparatus 100, it is noted that the scope of the present disclosure is not limited to such embodiments. For example, in some examples, a flame detection apparatus 100 in accordance with the present disclosure may be in other forms.

As depicted in FIG. 1, the flame detection apparatus 100 includes at least one flame detecting component 102 coupled to the housing 101 of the flame detection apparatus 100. In various embodiments, the flame detecting component 102 may be arranged, contained, or disposed partially or completely within the housing 101 of the flame detection apparatus 100. For example, as shown, at least a portion of the flame detecting component 102 may extend from a bottom surface of the housing 101. The flame detecting component 102 may be configured to detect one or more types of electromagnetic radiation (e.g., one or more frequencies or wavelengths) associated with a fire source within an environment. The one or more types of electromagnetic radiation can include visible light, UV or infrared radiation. Additionally, the flame detecting component 102 may be configured to receive and transmit communication signals (e.g., IR control signals). An example flame detecting component 102 may be or comprise an optical-based sensing component, for example, without limitation, a photodiode, a photosensor, an IR sensor, a UV sensor, and/or the like. In various embodiments, the flame detecting component 102 may include a light filter and/or lens to restrict the frequency of radiation receivable by the flame detecting component 102. As noted above, a flame detecting component 102 may be associated with a particular field of view based at least in part on the location of the flame detection apparatus 100, the positioning of the flame detecting component 102, and/or flame detection apparatus configuration settings. As such, a flame detection apparatus 100 field of view can by modified by physically changing the location of the flame detection apparatus 100 and/or pointing the flame detecting component in a particular direction. Additionally, the flame detection apparatus 100 field of view may also be programmatically adjusted by changing one or more flame detection apparatus 100 configuration settings. For example, the flame detecting component 102 of a flame detection apparatus 100 may be programmatically configured to operate up to a certain distance from the flame detecting component 102 (e.g., up to 15 meters, 30 meters, 45 meters or 60 meters) corresponding with characteristics of the potential fire source (e.g., a location and/or fuel type).

In various embodiments, the flame detecting component 102 is in electronic communication with controller component 104 of the flame detection apparatus 100 such that it can exchange data (e.g., receive and transmit data) with the controller component 104 of the flame detection apparatus 100. In some embodiments, the controller component 104 of the flame detection apparatus 100 may process data associated with radiation signals/information detected by the at least one flame detecting component 102 in order to determine parameters for causing activation (e.g., triggering) of an alert or alarm.

While FIG. 1 provides an example of a flame detecting component 102 that comprises a single component, it is noted that the scope of the present disclosure is not limited to the example shown in FIG. 1. In some examples, an example flame detecting component 102 may comprise one or more additional and/or alternative elements, and/or may be structured/positioned differently than that illustrated in FIG. 1. For example, an example flame detecting component 102 may comprise an array or plurality of elements.

As depicted in FIG. 1, the flame detection apparatus 100 comprises indication elements 106A and 106B configured to provide an indication (e.g., an alert) with respect to one or more functions of the flame detection apparatus 100. As shown, the indication elements 106A and 106B are coupled to a bottom surface of the flame detection apparatus 100. The indication elements 106A and 106B may be or comprise LEDs or similar visual elements. The one or more indication elements 106A and 106B may be configured to provide a visual indication of a particular color in response to certain detected conditions. In some examples, the one or more indication elements 106A and 106B may comprise at least a red LED, a yellow LED and a green LED. By way of example, the one or more indication elements 106A and 106B may be configured to cause activation of a green LED to indicate normal operating conditions, cause activation of a red LED to indicate a detected alarm condition and/or cause activation of a yellow LED to indicate an apparatus fault condition. Additionally and/or alternatively, in some embodiments, the flame detection apparatus 100 may comprise a display component (e.g., screen) for providing a visual indication (e.g., text). In some embodiments, the flame detection apparatus 100 may be configured to provide an auditory indication in response to detected conditions.

In various embodiments, the indication elements 106A and 106B are in electronic communication with controller component 104 of the flame detection apparatus 100 such that it can receive a control signal from the controller component 104 of the flame detection apparatus 100 to cause activation of the indication elements 106A and 106B. As noted, causing activation of the indication elements may comprise causing activation and deactivation of various LEDs and/or providing an indication via a display component.

Figure 3:
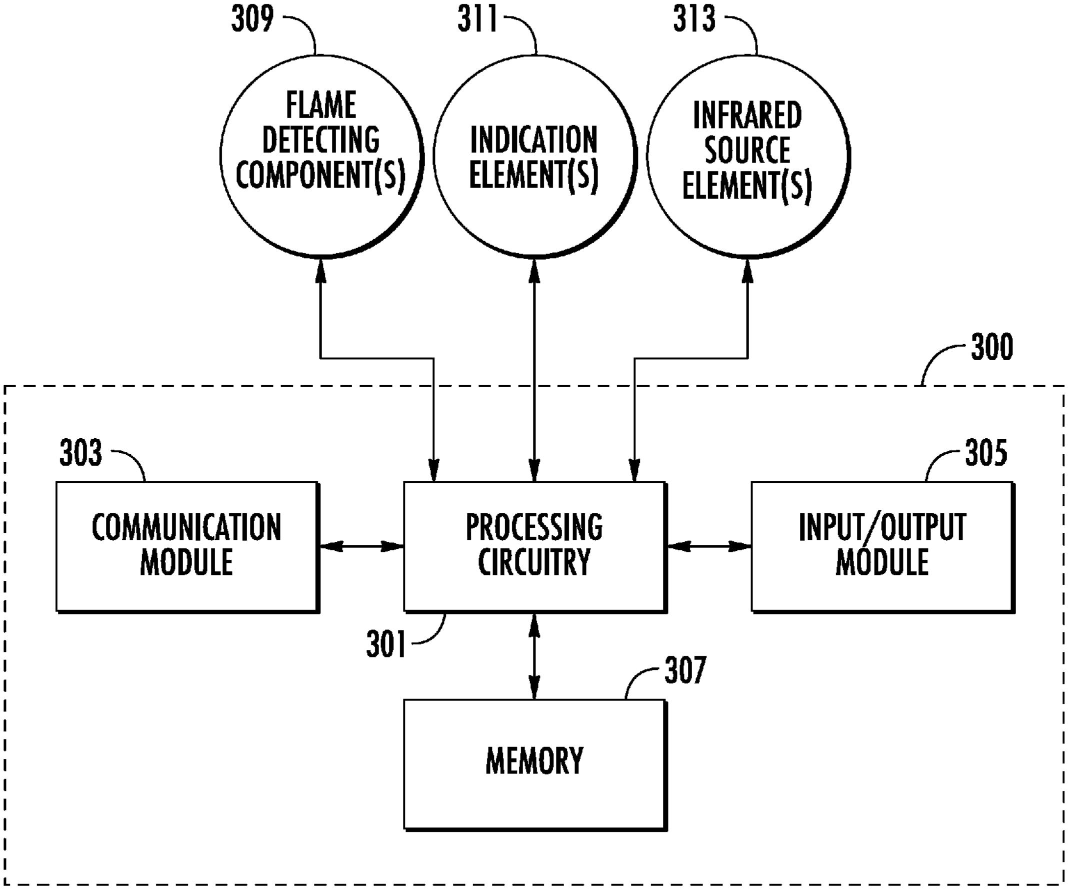
FIG. 3 illustrates an example controller component in electronic communication with various other components of an example apparatus in accordance with various embodiments of the present disclosure.

While FIG. 1 provides an example of a flame detection apparatus 100 that comprises an arrangement of two indication elements 106A and 106B, it is noted that the scope of the present disclosure is not limited to the example shown in FIG. 3. In some examples, an example flame detection apparatus 100 may comprise fewer or more additional and/or alternative elements, and/or may be structured/positioned differently than those illustrated in FIG. 1. For example, an example flame detection apparatus 100 may comprise a single indication element. Alternatively, an example flame detection apparatus 100 may comprise more than two indication elements.

As depicted in FIG. 1, the flame detection apparatus 100 comprises at least one IR source element 105 for testing and validating operations of the flame detection apparatus 100. The at least one IR source element 105 may be or comprise at least one semiconductor-based heating element configured to generate an output (e.g., radiation) incident on the flame detecting component 102. In various embodiments, the IR source element 105 may be or comprise a lamp, (e.g., a tungsten halogen lamp (QTH)), an LED and/or the like. As shown, the at least one IR source element 105 is located within the housing 101 of the flame detection apparatus 100 and in electronic communication with the controller component 104 such that it can receive a control signal from the controller component 104 in order to cause activation or deactivation of the at least one IR source element 105. In various embodiments, the output of the IR source element 105 may be analyzed by the controller component 104 in order to verify that the flame detecting component 102 is functioning properly. For example, the controller component 104 may determine that there is dirt or debris on a surface of the flame detecting component 102 and/or that it is otherwise malfunctioning. The controller component 104 may also determine that the flame detecting component 102 is free from dirt or debris and/or is functioning properly. Additionally and/or alternatively, in some embodiments, the flame detection apparatus 100 may comprise an aperture or window through which the IR source element 105 may provide an IR control signal to another apparatus/device.

While FIG. 1 provides an example of a flame detection apparatus 100 that comprises one IR source element 105, it is noted that the scope of the present disclosure is not limited to the example shown in FIG. 1. In some examples, an example flame detection apparatus 100 may comprise one or more additional and/or alternative elements, and/or may be structured/positioned differently than that illustrated in FIG. 1.

As depicted in FIG. 1, the flame detection apparatus 100 comprises a power source 108. An example power source 108 may be or comprise at least one battery (e.g., an 18-32 Vdc power source) in electronic communication with the controller component 104, the flame detecting component 102, the IR source element 105 and the indication elements 106A and 106B.

Figure 2:
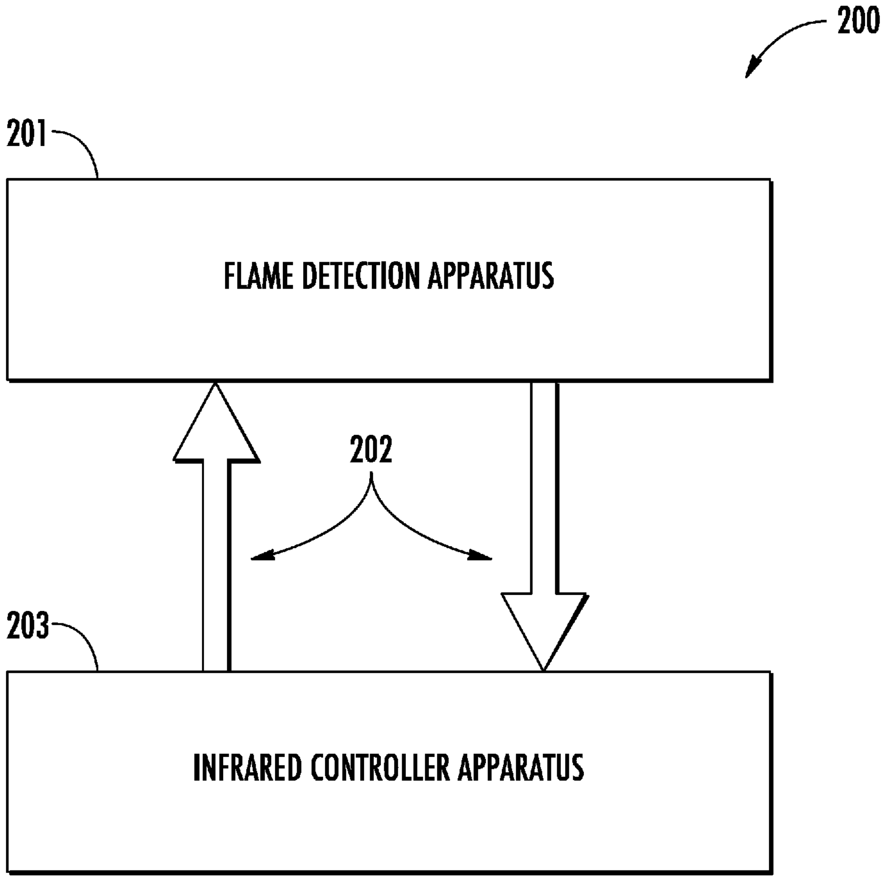
FIG. 2 illustrates an example schematic diagram depicting a system architecture in accordance with various embodiments of the present disclosure.

Referring now to FIG. 2, an example schematic diagram depicting an example system 200 in accordance with various embodiments of the present disclosure is provided. As illustrated, the system 200 comprises a flame detection apparatus 201 and an IR configurator apparatus 203. The flame detection apparatus 201 and IR configurator apparatus 203 are in electronic communication with one another such that they can exchange data (e.g., receive and transmit data) with one another, defining a bi-directional IR communication channel 202. In particular, the flame detection apparatus 201 and the IR configurator apparatus 203 can transmit IR control signals comprising information (e.g., messages) to one another.

The IR configurator apparatus 203 may be or comprise a IR-based remote control device comprising at least one IR source element (e.g., an LED) in electronic communication with processing circuitry (e.g., an IR transceiver). The IR source element of the IR configurator apparatus 203 is configured to generate IR control signals. The IR configurator apparatus 203 may be configured to communicate with a plurality of flame detection apparatuses 201 by being within a line of sight of the respective flame detection apparatus 201. The processing circuitry of the IR configurator apparatus 203 may transmit a control indication to the IR source element in order to cause activation or deactivation of the IR source element. An example IR control signal may comprise a carrier signal of a particular frequency (e.g., 38.5 kHz) and information such as pulses with particular characteristics. The IR configurator apparatus 203 can generate IR control signals which in turn are detected by the flame detection apparatus 201. The flame detection apparatus 201 and the IR configurator apparatus 203 may be configured to communicate using an established communication protocol. The communication protocol may comprise a set of rules for the exchange of data between the IR configurator apparatus 203 and the flame detection apparatus 201. The communication protocol may be or comprise definitions for a plurality of ordered pulse patterns each having certain pulse characteristics (e.g., voltage, duration, signal frequency, wavelength and/or the like). In some examples, the communication protocol may be a unique proprietary communication protocol in order to ensure communication security between the IR configurator apparatus 203 and the flame detection apparatus 201. By way of example, the proprietary communication protocol may be similar to the Serial Infra-Red Control (SIRC) communication protocol, the NEC protocol, the Philips RC5 or RC6 protocols. In some examples, the communication protocol may include security algorithms and diverse acknowledgement protocols. In various embodiments, information transmitted between the IR configurator apparatus 203 and the flame detection apparatus 201 may be encoded prior to transmission and decoded subsequent to being received. Each of the flame detection apparatus 201 and the IR configurator apparatus 203 may store encryption keys for encoding and decoding IR control signals. The IR configurator apparatus 203 may also be configured to detect IR control signals generated by the flame detection apparatus 201 and process (e.g., store and analyze) messages (e.g., pulses) contained therein. In various embodiments, the messages (e.g., pulses) transmitted by the flame detection apparatus 201 and/or IR configurator apparatus 203 may comprise configuration instructions, status information, information requests, an acknowledgement and/or the like.

The flame detecting component of flame detection apparatus 201 may be configured to detect IR control signals generated by the IR configurator apparatus 203. As noted, an example IR control signal may comprise a carrier signal of a particular frequency (e.g., 38.5 kHz) and information/messages (e.g., pulses). The controller component of the flame detection apparatus 201 may process (e.g., store and analyze) the received information (e.g., pulses) based at least in part on stored communication protocol information. The controller of the flame detection apparatus 201 may configure or modify at least one setting of the flame detection apparatus 201 in response to receiving the IR control signal and analyzing the information/message (e.g., pulses) contained therein.

As indicated above, the flame detection apparatus 201 may also be configured generate IR control signals (e.g., using the at least one IR source element) comprising a carrier signal of the same frequency (e.g., 38.5 kHz) utilized by the IR configurator apparatus 203. The flame detection apparatus 201 is configured to transmit IR control signals (i.e., carrier signals containing information/pulses) to the IR configurator apparatus 203. In various embodiments, the information/pulses provided by the flame detection apparatus 201 may describe information regarding a condition or status of the flame detection apparatus 201. For example, the information/pulses may describe a battery status, a fire detecting component operational status, other current settings associated with the flame detection apparatus 201, and/or the like. Additionally and/or alternatively the IR control signals generated and transmitted and by the flame detection apparatus may contain information (e.g., messages) indicating whether or not received configuration instructions were successfully executed. In some embodiments, the flame detection apparatus 201 may cause generation of an IR control signal in order to provide information in response to a request for information received from the IR configurator apparatus 203. In other examples, the flame detection apparatus 201 may automatically generate an IR control signal in order to transmit information in response to detected conditions that satisfy one or more stored parameters.

Referring now to FIG. 3, a schematic diagram depicting an example controller component 300 of an example apparatus in electronic communication with various other components in accordance with various embodiments of the present disclosure is provided. As shown, the controller component 300 comprises processing circuitry 301, a communication module 303, input/output module 305, a memory 307 and/or other components configured to perform various operations, procedures, functions or the like described herein.

As shown, the controller component 300 (such as the processing circuitry 301, communication module 303, input/output module 305 and memory 307) is electrically coupled to and/or in electronic communication with a flame detecting component 309, an indication element 311 and a IR source element 313. As depicted, each of the flame detecting component 309, the indication element 311 and the IR source element 313 may exchange (e.g., transmit and receive) data with the processing circuitry 301 of the controller component 300.

The processing circuitry 401 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 301 may comprise one or more processors. In one exemplary embodiment, the processing circuitry 301 is configured to execute instructions stored in the memory 307 or otherwise accessible by the processing circuitry 401. When executed by the processing circuitry 301, these instructions may enable the controller component 300 to execute one or a plurality of the functions as described herein. No matter whether it is configured by hardware, firmware/software methods, or a combination thereof, the processing circuitry 301 may comprise entities capable of executing operations according to the embodiments of the present invention when correspondingly configured. Therefore, for example, when the processing circuitry 301 is implemented as an ASIC, an FPGA, or the like, the processing circuitry 301 may comprise specially configured hardware for implementing one or a plurality of operations described herein. Alternatively, as another example, when the processing circuitry 301 is implemented as an actuator of instructions (such as those that may be stored in the memory 307), the instructions may specifically configure the processing circuitry 301 to execute one or a plurality of algorithms and operations described herein, such as those discussed with reference to FIG. 5.

The memory 307 may comprise, for example, a volatile memory, a non-volatile memory, or a certain combination thereof. Although illustrated as a single memory in FIG. 3, the memory 307 may comprise a plurality of memory components. In various embodiments, the memory 307 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 307 may be configured to store information, data, application programs, instructions, and etc., so that the controller component 300 can execute various functions according to the embodiments of the present disclosure. For example, in at least some embodiments, the memory 307 is configured to cache input data for processing by the processing circuitry 301. Additionally or alternatively, in at least some embodiments, the memory 307 is configured to store program instructions for execution by the processing circuitry 301. The memory 307 may store information in the form of static and/or dynamic information. When the functions are executed, the stored information may be stored and/or used by the controller component 300.

The communication module 303 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 307) and executed by a controller component 300 (for example, the processing circuitry 301). In some embodiments, the communication module 303 (as with other components discussed herein) may be at least partially implemented as the processing circuitry 301 or otherwise controlled by the processing circuitry 401. In this regard, the communication module 303 may communicate with the processing circuitry 401, for example, through a bus. The communication module 303 may comprise, for example, antennas, transmitters, receivers, transceivers, network interface cards and/or supporting hardware and/or firmware/software, and is used for establishing communication with another apparatus. The communication module 303 may be configured to receive and/or transmit any data that may be stored by the memory 307 by using any protocol that can be used for communication between apparatuses. The communication module 303 may additionally or alternatively communicate with the memory 307, the input/output module 305 and/or any other component of the controller component 300, for example, through a bus.

In some embodiments, the controller component 300 may comprise an input/output module 305. The input/output module 305 may communicate with the processing circuitry 301 to receive instructions input by the user and/or to provide audible, visual, mechanical or other outputs to the user. Therefore, the input/output module 305 may be in electronic communication with supporting devices, such as a keyboard, a mouse, a display, a touch screen display, and/or other input/output mechanisms. Alternatively, at least some aspects of the input/output module 305 may be implemented on a device used by the user to communicate with the controller component 300. The input/output module 305 may communicate with the memory 307, the communication module 303 and/or any other component, for example, through a bus. One or a plurality of input/output modules and/or other components may be included in the controller component 300.

For example, the flame detecting component 309 may be similar to flame detecting component 102 described above with regard to FIG. 1. For example, flame detecting component 309 may generate an IR control signal comprising a carrier signal and information (e.g., messages) and transmit the IR control signal to the processing circuitry 301. In some embodiments, indication element 311 may be similar to indication elements 106A and 106B described above with regard to FIG. 1. For example, indication element 311 may receive a control indication from the processing circuitry 301 triggering activation of the indication element 311. For example, indication element 311 may receive a second control indication from the processing circuitry 301 triggering deactivation of the indication element 311. In some embodiments, IR source element 313 may be similar to IR source element 105 described above with regard to FIG. 1. For example, IR source element 313 may receive a control indication from the processing circuitry 301 triggering generation of an IR control signal.

Figure 4:
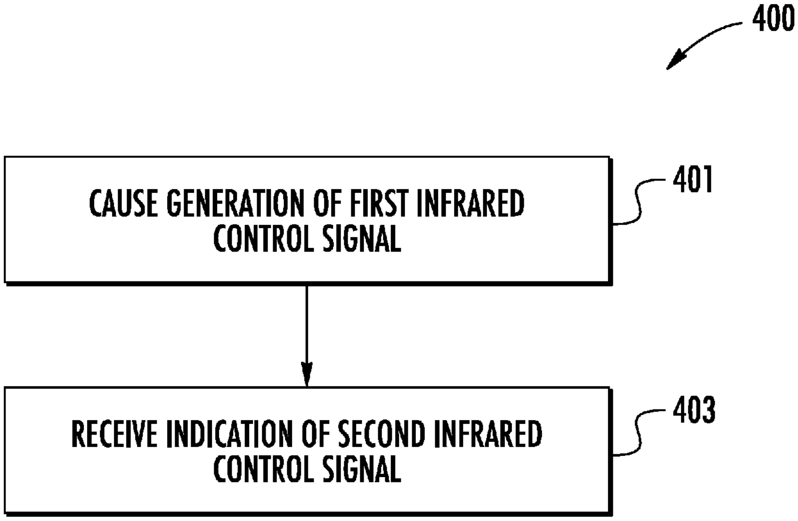
FIG. 4 is a flowchart diagram illustrating example operations in accordance with various embodiments of the present disclosure.
Figure 5:
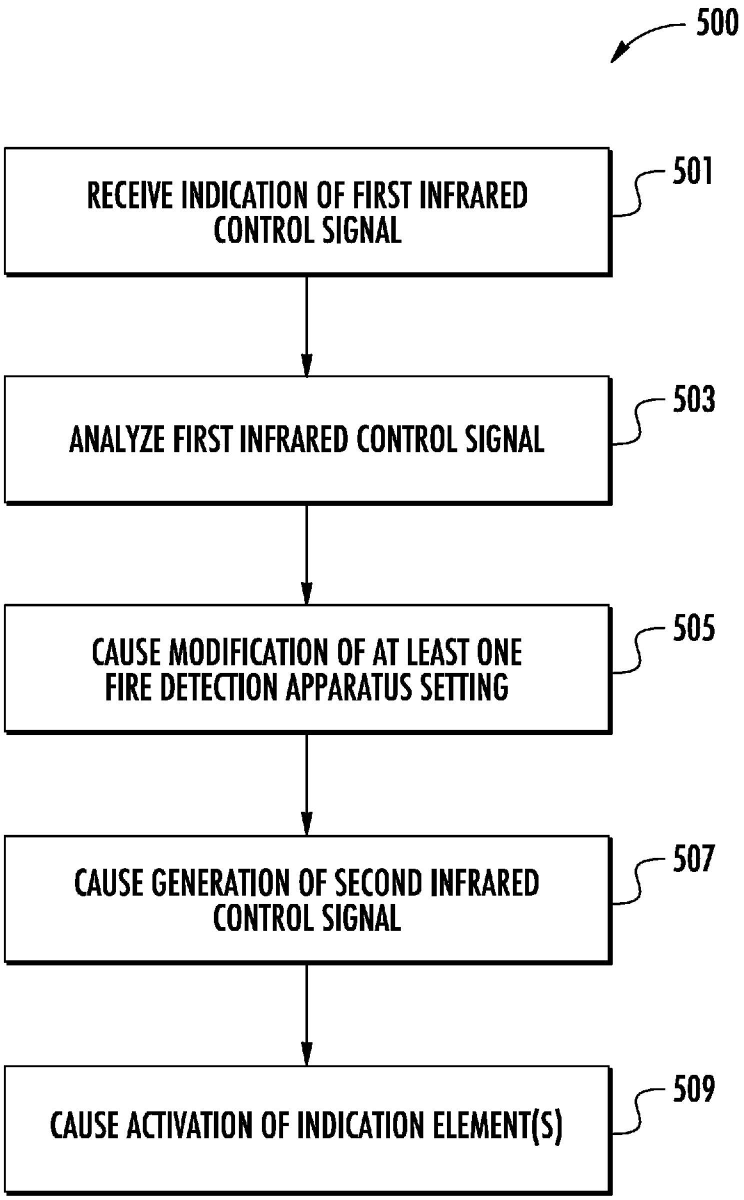
FIG. 5 is a flowchart diagram illustrating example operations in accordance with various embodiments of the present disclosure.

Referring now to FIG. 4 and FIG. 5, flowchart diagrams illustrating example operations 400 and 500, respectively, in accordance with various embodiments of the present disclosure are provided.

Referring now to FIG. 4, the method 400 may be performed by an IR configurator apparatus. The IR configurator apparatus may be similar to the IR configurator apparatus 203 described above with regard to FIG. 2. Additionally, the IR configurator apparatus may be similar to controller component 300 described above in regard to FIG. 3 and may similarly comprise processing circuitry 301, a communication module 303, an input/output module 305 and a memory 307. As noted above with regard to FIG. 2, the IR configurator apparatus may also comprise at least one IR source element for generating an IR control signal. In some examples, the processing circuitry of the IR configurator apparatus may be electrically coupled to and/or in electronic communication with other apparatuses and circuitries, such as, but not limited to the fire detection apparatus and a memory (such as, for example, random access memory (RAM) for storing computer program instructions).

In some examples, one or more of the procedures described in FIG. 4 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

In some embodiments, the example IR configurator apparatus may generate an IR control signal comprising a message (e.g., instruction or command) for the example flame detection apparatus to enter testing mode. In some examples, the flame detection apparatus may execute the instruction/command and generate an IR control signal comprising a message acknowledging that the flame detection apparatus is in testing mode. In some examples, subsequent to receiving a control signal comprising the acknowledgement from the flame detection apparatus, the IR configurator may transmit a control signal comprising a message (e.g., instruction or command) to test a system component (e.g., relay outputs). In some examples, subsequent to receiving the command, the flame detection apparatus may execute the instruction/command and generate a control signal comprising a message describing the results of the executed testing. In some examples, subsequent to receiving the control signal comprising the results of the executed testing, the IR configurator apparatus may generate a control signal comprising a message (e.g., instruction or command) for the flame detection apparatus to come out of testing mode and resume normal operations.

The example method 400 begins with step/operation 401. At step/operation 401, a processing circuitry (such as, but not limited to, the processing circuity of IR configurator apparatus 203 illustrated above in regard to FIG. 2) causes generation of a first IR control signal, for example, by a IR source element of the IR configurator apparatus. As noted above, the IR control signal may comprise a carrier signal containing information/messages (e.g., pulses). The pulses may describe a request for status information, configuration instructions and/or the like. The IR configurator apparatus may be caused to generate the IR control signal in response to a user actuating or selecting an input/output element (e.g., buttons, a display element/circuitry and/or the like) of the IR configurator apparatus. The IR configurator apparatus may comprise a plurality of input/output elements, each corresponding with information and/or actions in accordance with the stored communication protocol. By way of example, a first button may be selected to request status information from a flame detection apparatus and a second button may be selected to cause transmission of a particular set of instructions to the flame detection apparatus. In some embodiments, the IR configurator apparatus may display information received from the flame detection apparatus via the display element/circuitry. As noted, in some embodiments, the IR configurator apparatus may be configured to encode information prior to generating the first IR control signal such that secured encoded information (e.g., messages) is provided to the flame detection apparatus.

Subsequent to step/operation 401, the example method 400 proceeds to step/operation 403. At step/operation 403, the processing circuitry receives an indication of a second IR control signal. In various embodiments, the second IR control signal may be detected by an IR transceiver of the IR configurator apparatus. The second IR control signal may be generated by a flame detecting component of a flame detection apparatus in electronic communication with the IR configurator apparatus. The second IR control signal may similarly comprise a carrier signal containing information/messages (e.g., pulses). The pulses may describe requested status information, confirmation of executed instructions and/or the like. As noted, in some embodiments, the IR configurator apparatus may be configured to decode information received from the flame detection apparatus (e.g., using stored encryption information/keys) in order to ensure communication security.

Referring now to FIG. 5, in some examples, the method 500 may be performed by a processing circuitry (for example, but not limited to, an application-specific integrated circuit (ASIC), a central processing unit (CPU)). In some examples, the processing circuitry may be electrically coupled to and/or in electronic communication with other circuitries of the example apparatus, such as, but not limited to, a flame detecting component, an indication element, a IR source element, a memory (such as, for example, random access memory (RAM) for storing computer program instructions), and/or a display circuitry (for rendering information on a display).

In some examples, one or more of the procedures described in FIG. 5 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

The example method 500 begins at step/operation 501. At step/operation 501, a processing circuitry (such as, but not limited to, the processing circuitry 301 of the controller component 300 illustrated in connection with FIG. 3, discussed above) receives an indication of the first IR control signal. As noted, the first IR control signal may be generated by an IR configurator apparatus and detected by the flame detecting component of the flame detection apparatus. In some embodiments, a flame detecting component (such as, but not limited to, the flame detecting component 309 illustrated in connection with FIG. 3) may detect the first IR control signal and provide an indication associated therewith to the processing circuitry.

Subsequent to step/operation 501, the example method 500 proceeds to step/operation 503. At step/operation 503, the processing circuitry analyzes the first IR control signal (e.g., information/pulses) based on stored communication protocol information in order to identify one or more instructions contained therein. As noted above, in some embodiments, analyzing the first IR control signal and information/pulses contained therein comprises decrypting the information based at least in part on encryption keys stored in memory (such as, but not limited to, the memory 307 of the controller component 300 illustrated in connection with FIG. 3, discussed above).

In some embodiments, the processing circuitry may determine that the first IR control signal does not contain any instructions or did not originate from the IR configurator apparatus. In such examples, the processing circuitry may determine not to take any further action in relation to the detected IR control signal. In another example, the processing circuitry may determine that the IR control signal contains an information request and cause generation of a second IR control signal containing the requested information. Causing generation of a second IR control signal may comprise transmitting a control indication to a IR source element (such as, but not limited to, the IR source element 313 illustrated in connection with FIG. 3, discussed above). Causing generation of the second IR control signal may comprise causing a switch or relay connected to the IR source element (e.g., heating element) to be turned on in response to receiving the control indication.

Subsequent to step/operation 503, the method 500 proceeds to step/operation 505. At step/operation 505, the processing circuitry causes configuration of at least one configuration setting associated with the flame detection apparatus. In various embodiments, causing configuration of the at least one configuration setting associated with the flame detection apparatus may comprise programmatically modifying one or more settings of a flame detecting component such as adjusting a field of view or adjusting a flame detecting component sensitivity setting. By way of example, causing modification of one or more settings of the flame detecting component may comprise increasing or decreasing a sensitivity setting. Additionally and/or alternatively, any flame detection apparatus configuration that can be adjusted using wired communication protocols as described above can also be adjusted using techniques described in the present disclosure. These settings may include, for example, without limitation fire detection apparatus output relay settings, verification time settings, false alarm rejection threshold settings, and/or the like.

Subsequent to step/operation 505, the method proceeds to step/operation 507. At step/operation 507, the processing circuitry causes generation of a second IR control signal. In some embodiments, the second IR control signal may comprise flame detection apparatus identification information and/or metadata such that another apparatus (e.g., the IR configurator apparatus) can associate received information with a particular flame detection apparatus from a plurality of flame detection apparatuses within a network. In some embodiments, causing generation of a second IR control signal may comprise transmitting a control indication to a IR source element (such as, but not limited to, the IR source element 313 illustrated in connection with FIG. 3, discussed above). In some examples, causing generation of the second IR control signal may comprise transmitting a control indication to an IR source element (such as, but not limited to, the IR source element 313 illustrated in connection with FIG. 3, discussed above). Causing activation of the IR source element may comprise causing a switch or relay connected to the IR source element (e.g., heating element) to be turned on in response to receiving the control indication.

Subsequent to step/operation 507, the method proceeds to step/operation 509. At step/operation 509, in addition to causing generation of the second IR control signal, in some embodiments, the processing circuitry causes activation of indication element(s) (such as, but not limited to, the indication elements 106A and 106B described above in connection with FIG. 1). Causing activation of the indication elements may comprise causing a switch or relay connected to the indication element(s) to be turned on in response to receiving the control indication. For example, subsequent to successfully executing received instructions, the processing circuitry may cause a green LED to be turned on. In another example, in an instance in which detected conditions necessitate a status update that has not been requested, the processing circuitry may cause one or more LEDs to execute a recognizable pattern in order to notify a user to use an IR configurator apparatus to request or obtain information from the flame detection apparatus.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A flame detection apparatus comprising:
- a controller component;
- at least one indication element; and
- at least one flame detecting component in electronic communication with the controller component, wherein the at least one flame detecting component is configured to:
  - receive a first infrared (IR) control signal comprising a configuration instruction generated by an IR configurator apparatus, and
  - in response to receiving the first IR control signal, provide an indication of the first IR control signal to the controller component, wherein the controller component is configured to:
    - analyze the first IR control signal to identify the configuration instruction,
    - cause modification of at least one configuration setting of the at least one flame detecting component, wherein causing modification of the at least one configuration setting comprises causing modification of a sensitivity setting, cause a generation of a second IR control signal, and subsequent to causing the generation of the second IR control signal, cause an activation of the at least one indication element.

2. The flame detection apparatus of claim 1, wherein causing modification of the at least one configuration setting comprises adjusting a field of view associated with the at least one flame detecting component.

3. The flame detection apparatus of claim 1, wherein the at least one flame detecting component comprises at least one IR sensor.

4. The flame detection apparatus of claim 1, wherein the IR configurator apparatus comprising at least an IR transceiver and at least one IR source element.

5. The flame detection apparatus of claim 4, wherein the flame detection apparatus further comprises one or more IR source elements.

6. The flame detection apparatus of claim 4, wherein an output of the at least one IR source element is analyzed by the controller component to verify that the at least one flame detecting component is functioning properly.

7. The flame detection apparatus of claim 5, wherein each of the flame detection apparatus and the IR configurator apparatus comprise encryption keys for encoding and decoding information contained in IR control signals.

8. The flame detection apparatus of claim 5, wherein each of the flame detection apparatus and the IR configurator apparatus are configured to generate IR control signals based at least in part on a proprietary communication protocol.

9. A method for forming a wireless communication channel, the method comprising:

receiving, by a controller component of a flame detection apparatus, an indication of a first infrared (IR) control signal comprising a configuration instruction, wherein the first IR control signal is received by at least one flame detecting component of the flame detection apparatus in electronic communication with the controller component, wherein the at least one flame detecting component is configured to receive the first IR control signal comprising the configuration instruction generated by an IR configurator apparatus;

analyzing, by the controller component, the first IR control signal to identify the configuration instruction;

causing, by the controller component, a modification of at least one configuration setting of the at least one flame detecting component, comprising causing modification of a sensitivity setting;

causing, by the controller component, a generation of a second IR control signal; and subsequent to causing the generation of the second IR control signal, causing, by the controller component, an activation of at least one indication element of the flame detection apparatus.

10. The method according to claim 9, wherein causing modification of the at least one configuration setting comprises adjusting a field of view associated with the at least one flame detecting component.

11. The method according to claim 9, wherein the at least one flame detecting component comprises at least one IR sensor.

12. The method according to claim 9, wherein the IR configurator apparatus comprising at least an IR transceiver and at least one IR source element.

13. The method according to claim 12, wherein the flame detection apparatus further comprises one or more IR source elements.

14. The method according to claim 13, wherein an output of the at least one IR source element is analyzed by the controller component to verify that the at least one flame detecting component is functioning properly.

15. The method according to claim 13, wherein each of the flame detection apparatus and the IR configurator apparatus comprise encryption keys for encoding and decoding information contained in IR control signals.

16. The method according to claim 13, wherein each of the flame detection apparatus and the IR configurator apparatus are configured to generate IR control signals based at least in part on a proprietary communication protocol.

* * * * *